E. H. GRATIOT.
Drier for Grain and Middlings.
No. 200,908. Patented March 5, 1878.
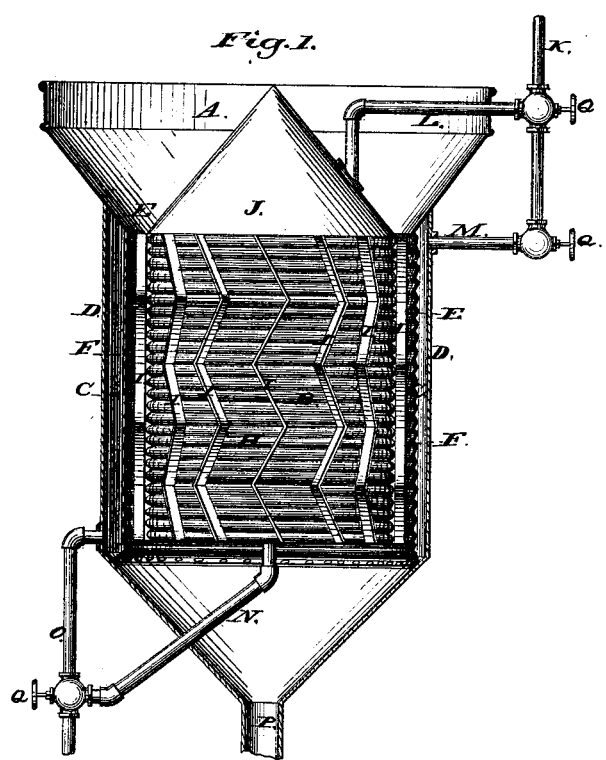
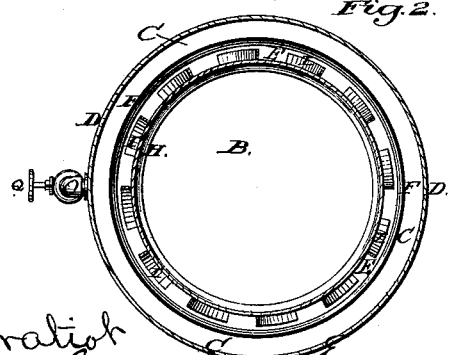

UNITED STATES PATENT OFFICE.

EDWARD H. GRATIOT, OF PLATTEVILLE, WISCONSIN.

IMPROVEMENT IN DRIERS FOR GRAIN AND MIDDLINGS.

Specification forming part of Letters Patent No. 200,908, dated March 5, 1878; application filed April 5, 1877.

*To all whom it may concern:*

Be it known that I, EDWARD HEMPSTEAD GRATIOT, of Platteville, Grant county, Wisconsin, have invented certain new and useful Improvements in Wheat or Grain Heaters and Middlings-Driers for Milling Purposes; and I do hereby declare that the following is a full, clear, and exact description thereof, which will enable others skilled in the art to which it appertains to make and use the same, reference being had to the accompanying drawing, and to the letters of reference marked thereon, which form a part of this specification.

My invention relates to improvements in mills where wheat or other grain is ground for the purpose of making flour, and where a heater or similar device is used for the purpose of warming or heating the grain before it is thrown into the hopper or on the grinding-burrs; and it can also be used for the purpose of drying what is known among the millers as "middlings;" and relates to the mode of constructing the said heaters or driers, so that a maximum heating-surface and such movements of the grain will be attained in passing through the heater that the grain will be evenly and thoroughly heated by being brought into contact with the said heating-surfaces and under the influence of the heat radiated therefrom, so that it will be put in the best possible condition for grinding purposes, or, in case it is used as a middling-drier, so that they will be evenly and thoroughly dried by means of the heater, the peculiar arrangement and construction of which will be more fully explained by reference to the drawing hereunto annexed.

Figure 1 represents a partly-sectional view, showing the several parts; and Fig. 2 is a horizontal section.

A represents the hopper of the apparatus, into which the grain or middlings is first poured. B represents the inner heating cylinder or drum, for steam or hot air, with corrugated sides. C represents the outer heating-chamber, for steam or hot air, with corrugated side F, and is formed by D and E, suitably fastened together at top and bottom, so as to be steam-tight. D represents outer shell of heater. E represents space for passage of grain or middlings. F represents inner corrugated wall or side of steam or hot-air chamber C of heater. H represents corrugations of sides of inner cylinder. I represents guiding-strips, or grain or middlings mixers, which may be used or not, as may be desired. J represents a conical cover of heating-cylinder B, which carries the grain or middlings into the space E between outer steam or hot-air chamber C and inner cylinder B. K represents the steam or hot-air pipe supplying heat to the apparatus, which is regulated by stop-cocks. L represents an auxiliary pipe, conducting steam or hot air into cylinder B. M represents an auxiliary pipe, conducting steam or hot air into steam or hot-air chamber C. N represents the exhaust-pipe of the cylinder B. O represents the exhaust-pipe of steam or hot-air chamber C. P represents the place of exit of the grain or middlings from the apparatus to the burrs. Q represents the stop-cocks.

The grain or middlings, after being poured into upper hopper A, passes down into space E between inner cylinder or drum B, strips or grain-mixers I, and steam or hot-air chamber C, and is heated by radiated heat from said cylinder B, grain-mixers I, and outer steam or hot-air chamber C. As the grain or middlings passes down space E it is interrupted in its passage by the corrugated sides of cylinder B, grain-mixers I, and corrugated side of steam or hot-air chamber C, and is thereby turned over and stirred, and more thoroughly exposed to the action of heat than it otherwise would be.

I claim—

The combination of cylinder B with corrugated sides H, the outer steam or hot-air chamber C, with inner corrugated side F, and with or without grain or middlings mixers or strips I, substantially as and for the purpose specified.

EDWARD HEMPSTEAD GRATIOT.

In presence of—
SYLVENDER B. SPENCER,
GEO. H. GRATIOT.